June 28, 1966  C. P. GRAVENOR ETAL  3,258,332
HYDROMETALLURGICAL METHOD FOR SELECTIVE METAL REMOVAL
Filed Oct. 16, 1962  4 Sheets-Sheet 2

Inventors
CONRAD PERCIVAL GRAVENOR
GERALD JAMES GOVETT
TYSON RIGG
by: Cavanagh & Norman

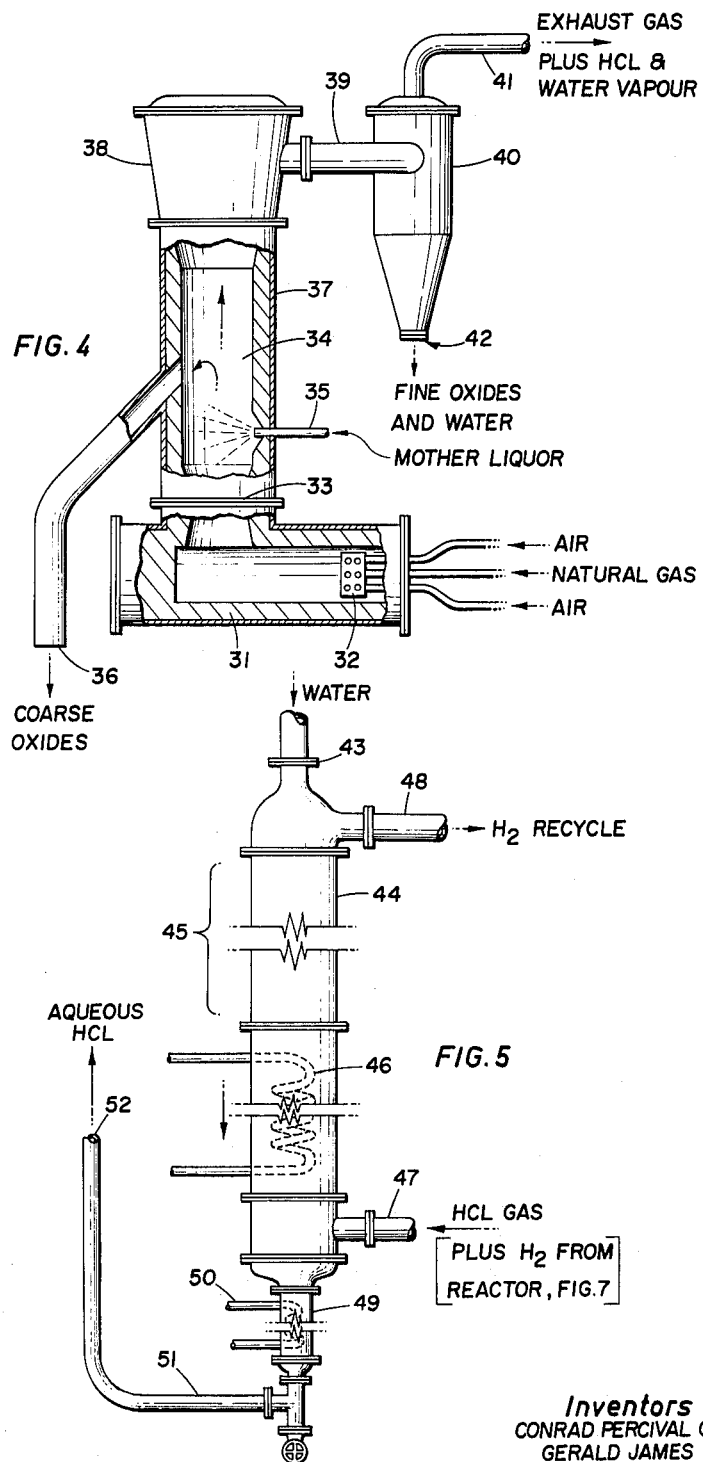

June 28, 1966 C. P. GRAVENOR ETAL 3,258,332
HYDROMETALLURGICAL METHOD FOR SELECTIVE METAL REMOVAL
Filed Oct. 16, 1962 4 Sheets-Sheet 4

*Inventors*
CONRAD PERCIVAL GRAVENOR
GERALD JAMES GOVETT
TYSON RIGG
by: *Cavanagh & Norman*

United States Patent Office 3,258,332
Patented June 28, 1966

3,258,332
HYDROMETALLURGICAL METHOD FOR
SELECTIVE METAL REMOVAL
Conrad Percival Gravenor, Gerald James Govett, and
Tyson Rigg, Edmonton, Alberta, Canada, assignors to
The Research Council of Alberta, Edmonton, Alberta,
Canada
Filed Oct. 16, 1962, Ser. No. 230,935
6 Claims. (Cl. 75—114)

This invention relates to a method and apparatus for the direct hydrometallurgical extraction of metals from minerals and other substances.

The leaching of a metal from a mineral has been practiced heretofore in laboratory and pigment production techniques by precipitating out an oxide or other metal compound from the leach liquor or concentrating the leach liquor such as by evaporation, boiling or the like to effect the crystallizing out of a metal compound. The reduction of metal compounds thus obtained to metallic form by utilizing a reducing gas such as carbon monoxide or hydrogen is known in the production of metal powders. Such methods have never been wholly integrated as a continuous process and while volumes of metal powder have been made by chemical techniques the direct hydrometallurgical effectively sulphur free extraction of metals from minerals and mineral-like substances remains largely unpracticed. One commercial attempt of recent years involves the conversion of a selected mineral to a metal compound in the gaseous phase from which it is condensed by distillation in direct metallic form under conditions of somewhat difficult control and of low volume of product. Thus the direct extraction of metals and especially of iron in large quantity from iron minerals and iron compound containing substances such as natural earths and the like on a commercial scale as a source of iron metal comparable to that provided by blast furnace and other pyrometallurgical techniques may be said to be unknown in commercial practice. The problem and cost of the beneficiation of many iron ores and other low grade ores to render then useful for pyrometallurgical processing is sufficient to render extensive mineral deposits useless for economic exploitation.

It is a primary object of this invention to provide a method and apparatus for the extraction of metals from substances by an extraction process which does not require beneficiation of the substances or ores operated upon either in the same way or to the same degree as pyrometallurgical process and which is adapted selectively to deliver a direct metal product in large volume from mineral ores and low grade substances.

It is another object of the invention directly selectively to extract a metal of high purity and effectively free of sulphur, phosphorus arsenic and other contaminants from a mineral or other metal or metal compound containing substance or substances by first preparing the material to render the desired metal containing components thereof soluble in hydrochloric acid as may be necessary, leaching said components into solution with liquid aqueous hydrochloric acid, selectively crystallizing out at least one metal chloride to crystalline form, dehydrating the metal chloride crystals, reducing the dehydrated crystals to metallic form thus to obtain the direct metal product and hydrolizing the mother liquor from the metal chloride crystal formation step to recover the hydrochloric acid for recirculation and to obtain oxides of other metals thereby to achieve of the order of greater than 90% of hydrochloric acid recovery and preferably in excess of 96% hydrochloric acid recovery in continuous circuit while yielding a high efficiency extraction of the thus selected metal from the starting material.

Other objects of the invention will be apparent from a study of the following specification taken in conjunction with the following drawings.

In the drawings:

FIGURE 4 is a diagrammatic illustration of a suitable form of hydrolizer for hydrochloric acid recovery;

FIGURE 5 illustrates a suitable form of hydrochloric acid absorber;

Figure 1:
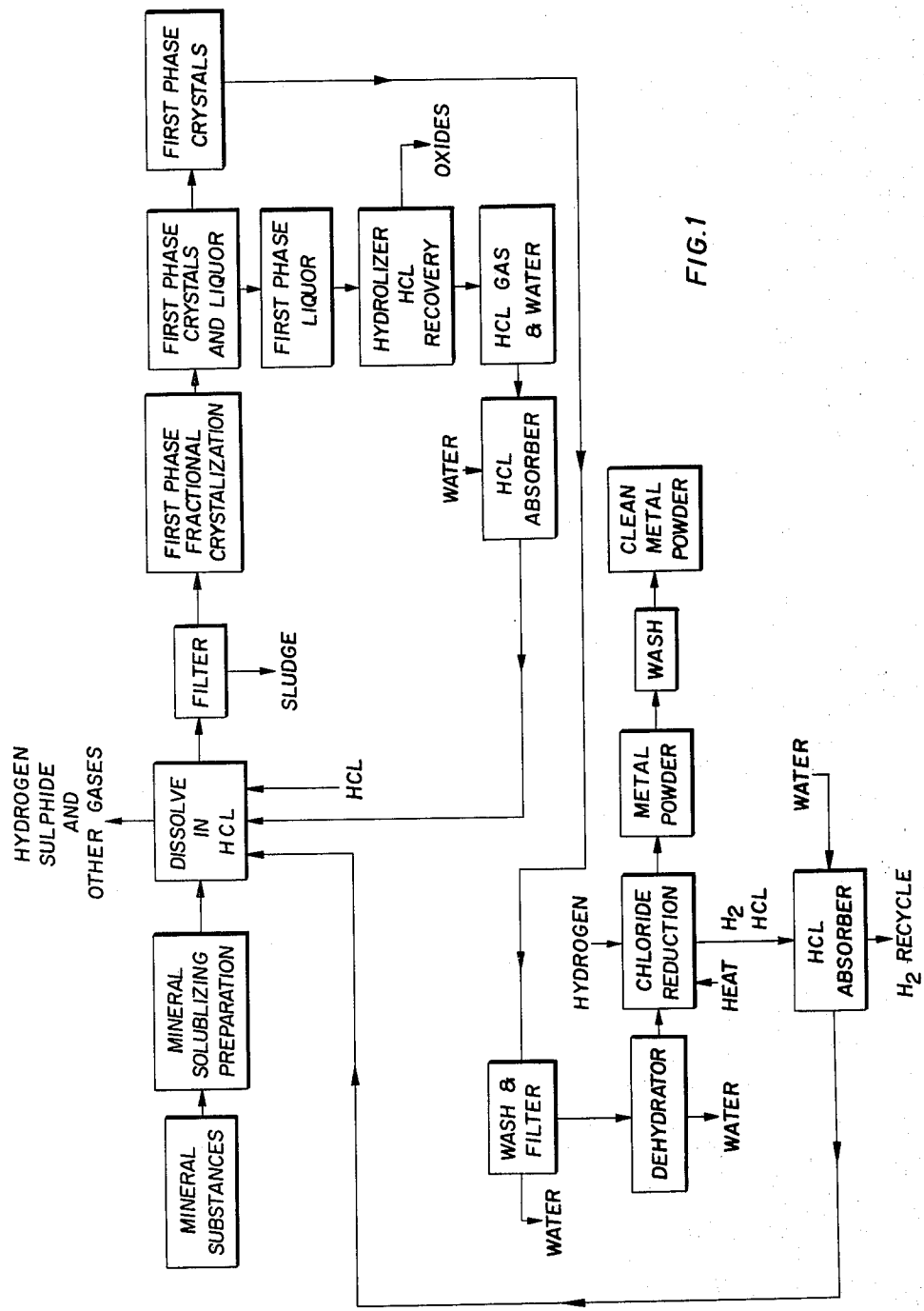
FIGURE 1 is a flow sheet of the main steps of the process of the invention.

The method and process of the invention is described herein mainly in relation to its use in the recovery of iron metal from iron mineral or iron compound containing materials and mixtures such as natural earth substances and mineral ores. The method herein is useful for the extraction of any metal from a chemical composition thereof which is soluble in hydrochloric acid or is adapted to be converted to an acid soluble form as for example salts of cobalt, nickel, tin, zinc and copper hereinafter referred to as (metal) in order to distinguish the same from other metal or metals.

In seeking a high yield recovery of a metal such as iron from low grade natural earths and mineral mixtures by methods of this invention the soluble metal chloride to be formed usually will be available from a direct hydrochloric acid leaching of crushed material. Otherwise a partial reduction by low temperature roasting with reductant such as lignite, peat, wood, bituminous coals, anthracite or by anaerobic bacteria such as by feeding on a suitable organic substrate such as sugar crop waste or other methods of reduction such as by natural gas or hydrogen may be used, any or all of such reduction methods being practiced at temperatures below 1000° C.

Thus in dealing specifically by way of illustration in this disclosure in the extraction of iron metal as a main metal of interest, reference is made to FIGURE 1 wherein the mineral substances are subjected to a mineral solubilizing preparation by partial reduction as described and prior to and/or after such solubilizing crushed and/or suitably ground to prepare the substances hereinafter referred to as the starting material, or simply "material," for solution in aqueous hydrochloric acid of the main mineral substance of interest therein. In many instances solubilizing as part of preparation may be unnecessary.

In the extraction of iron the iron bearing material is crushed and mixed with a suitable reductant and then heated in a suitable apparatus such as a kiln or multiple-hearth furnace. In practice, it has been found that low rank coal is an excellent reductant and although the amount of reductant added will depend upon the nature of the reductant, it also depends upon the nature of the iron-bearing material, in particular the proportion of ferrous iron in the raw material.

It should be especially noted that the coal is not coked or preheated (other than possibly to drive off unwanted moisture) prior to mixing with the iron-bearing material.

The temperature at which partial reduction takes place again in part depends upon the nature of the reductant and the iron-bearing material. Using bituminous coal and raw materials made up essentially of ferric oxides it has been found that partial metallization occurs after heating for half an hour at temperatures in the range 750° C. to 875° C. The effectiveness of the coal in this preliminary reduction increased with its hydrogen content, thus lignite is particularly effective.

If ores containing the iron already in the ferrous state (e.g., as siderite in black band ironstones) are available the preliminary reduction stage will be superfluous and the crushed ore can be fed directly to the leaching tank. Examples of iron-bearing materials successfully tested are oolitic iron ore from the Swift Creek region of Alberta, high grade ore from the Mesabi range and lateritic soil from Northern Rhodesia.

The partially reduced ore is leached with hydrochloric acid, preferably containing 30–38 percent HCl. Nascent hydrogen produced from the reaction between metallic iron and hydrochloric acid reacts with any ferric chloride to produce ferrous chloride. Furthermore, there is probably a direct reduction of ferric chloride by iron as follows:

$$2FeCl_3 + Fe \rightarrow 3FeCl_2$$

In practice, it is found that a slight excess metallization is desirable to ensure the complete reduction of ferric to ferrous chloride.

After leaching is complete the slurry of ferrous chloride liquor and insoluble material is pumped to a centrifuge or other continuous filtering device where the liquor is separated from the waste. The waste is washed in the centrifuge or on the filter and the washings added to the ferrous chloride filtrate. The liquor at this stage will vary in composition depending upon the amount and type of acid soluble material in the reduced ore. The composition of a typical leachate is shown in Table 1.

hydrate the chloride such as in a heated ribbon-type screw conveyor through which a dry mixture of hydrogen and hydrogen chloride is passed countercurrently. A suitable gas mixture is the exhaust gas from the reactor in which the ferrous chloride is reduced to iron. This reactor is similar to the dehydrator but is run at a temperature preferably in the range 575–675° C. compared with 300–450° C. in the dehydrator.

The equilibrium constant for the reduction reaction is given by the equation:

$$K_p = \frac{p^2 HCl}{pH_2}$$

This constant increases with temperature, hence it can be seen that if the temperature in the dehydrator is less than that in the reduction reactor no ferrous chloride will be reduced in the dehydrator if the gas pressures are suitably controlled. In a small scale operation it may be desirable to combine the functions of dehydrator and reduction reactor in one machine. In all cases it is preferable that the gas and solids move in a countercurrent fashion.

The hydrogen and hydrogen chloride exhausted from the reduction stage is passed through a hydrochloric acid absorption tower where hydrochloric acid for the leaching stage is recovered. The hydrogen is recirculated to the reduction stage and, for this purpose, need not be completely dried.

The crude iron product from the reduction reactor is cooled in an atmosphere of hydrogen or inert gas then may be scrubbed with a minimum volume of water to remove any soluble chlorides. After washing the iron is dried in an atmosphere of hydrogen or inert gas. An analysis of a typical iron powder made from singly crys-

TABLE 1

*Typical analyses of Swift Creek ore, leachate and iron product*

(ALL FIGURES ARE PERCENT BY WEIGHT EXCEPT FOR THE LEACHATE WHICH REFER TO PERCENT WEIGHT/VOLUME.)

Sample

| Constituent | Ore | Leachate | $FeCl_2 4H_2O$ single crystallization (washed) | $FeCl_2 4H_2O$ double crystallization (not washed) | Iron product from single crystallization $FeCl_2 4H_2O$ |
|---|---|---|---|---|---|
| Fe | 35.4 | ¹ 19.5 | 25.1 | 27.0 | 96.70 |
| $SiO_2$ | 24.2 | 0.24 | | | 0.01 |
| $Al_2O_3$ | 5.74 | ¹ 2.42 | 0.93 | 0.36 | 1.90 |
| $TiO_2$ | 0.43 | 0.06 | 0.01 | 0.01 | 0.05 |
| CaO | 1.33 | ¹ 0.75 | 0.12 | 0.05 | 0.06 |
| MgO | 0.88 | ¹ 0.49 | 0.23 | 0.23 | 0.80 |
| Mn | 0.27 | ¹ 0.07 | 0.05 | 0.03 | 0.20 |
| P | 0.71 | 0.32 | 0.04 | 0.01 | 0.04 |
| S | 0.044 | | | | 0.01 |

¹ Present as chlorides in the leachate.

The filtered liquor is fed into a continuously operated crystallizing evaporator where a mixture of ferrous chloride tetrahydrate and mother liquor is removed from the system. The mother liquor is removed from the crystals by filtration or centrifugation. The drained crystals may then be washed with water or a saturated ferrous chloride solution which has been obtained by dissolving some of the crystals. The crystals so produced are of good quality.

If it is desired to make substantially chemically pure iron powder, the ferrous chloride can be redissolved and recrystallized. The composition of the crystals produced is shown before and after recrystallization in Table 1. The mother liquor from the crystallizer is found to contain only a small proportion of the iron but a considerable and valuable amount of soluble chlorides of other metals such as aluminum, calcium, magnesium, etc. The chloride in the mother liquor is recovered by hydrolysis, leaving a mixture of oxides from which the metal values may be recovered if required.

In the presently described process it is preferred to detallized ferrous chloride obtained from Swift Creek ore is shown in Table 1. It can be seen that this iron is of notably better quality than the melting stock usually produced from low grade ores by pyrometallurgical methods.

The impurities in the iron powder produced by the method described here are of a different nature from those generally present in pig iron. The latter may contain as little as 90% iron together with 1.0% Si, 1.0% Mn, 0.03% S, 0.4% P and about 5% C. These impurities are for the most part chemically bound and difficult to remove. On the other hand the impurities in the iron powder made by the hydrometallurgical method of the invention are largely present only in admixture and may be separated partly by physical means such as washing or magnetic scrubbing. Alumina may be washed out with a solution of sodium carbonate followed by water washing. It should be noted that the analysis of the iron product given in Table I refers to a powder that has not had special purification of this nature.

If recrystallized ferrous chloride is used a very high grade of iron powder is obtained: this powder is suitable for powder metallurgical applications. All the iron powders produced by the process of the invention are nonpyrophoric.

The method of the invention entails the use of simple structures whereby equipment costs are kept relatively low as compared with equipment required in pyrometallurgical processing. While the processing devices illustrated in FIGURES 3 to 7 are related to devices of somewhat the same general form, operation and purpose separately used special purpose devices of the prior art, there are important aspects of combined structure and operation in connection therewith which yield a unique and highly efficient result according to this invention derived from the overall combination and the method herein.

Figure 3:
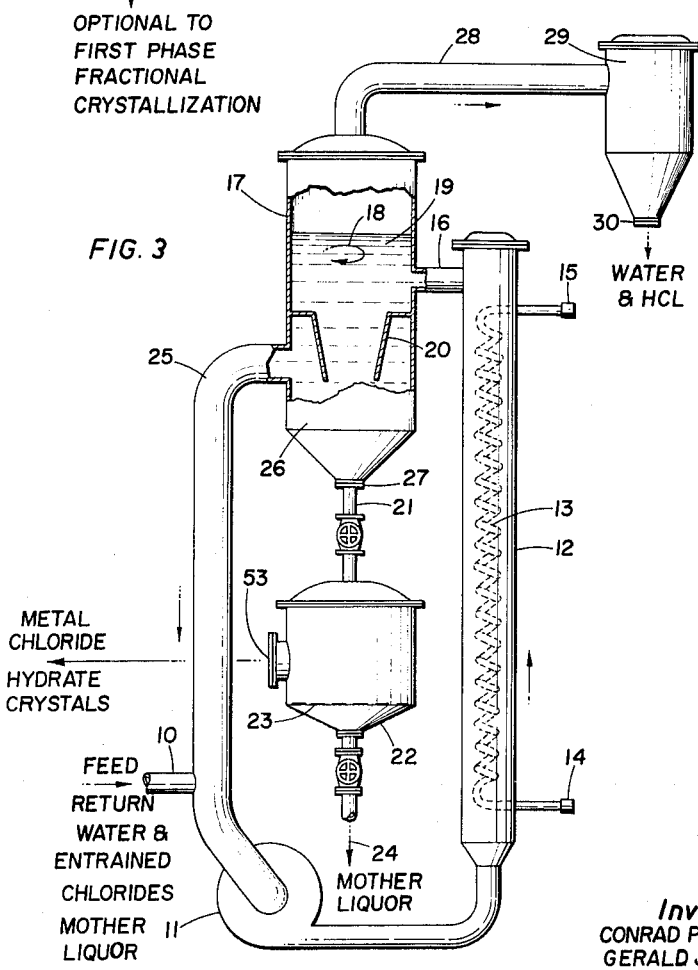
FIGURE 3 is a diagrammatic illustration of a series type fractional crystallization apparatus to be used in circuit in the invention.

Thus, in FIG. 3, a fractional crystallization device of the invention is revealed partly in section in which both temperature and pressure are controlled simultaneously. Thus metal chlorides in solution are introduced into the feed line 10 connecting to pump 11 directing flow to the heat exchanger tower 12 containing the heat control column 13 in the form of a liquid conducting coil adapted to communicate a heating liquid therethrough between the connecting point fittings 14 and 15. The upper end of column 12 discharges by line 16 tangentially into tank 17 to develop a circulating current 18 in the liquor 19 having metal chloride crystals formed therein. A baffle guide 20 assists in the formation of a vortex like current delivering the crystals downwardly through the connecting line 21 to the crystal collecting chamber 22 having a screen or other suitable filter means 23 therein, the mother liquor being delivered from the outlet line 24. The return line 25 arrests the circulating currents in the lower regions 26 of tank 17 assisting in the delivering of crystals to the crystal outlet 27 thereof and recirculates a major portion of the mother liquor. The formation of crystals takes place in chamber 17 at controllable pressure and temperature, the pressure being controlled by the pressure at which distillate is removed. Specifically, the device of FIGURE 3 permits the selective crystallization of a desired chloride from the mother liquor feed. Those contained chlorides having a higher crystallization point than the selected operating point proceed with the mother liquor from the outlet 24 thereof which may be returned to feed or other processing for selection of chlorides therefrom. On the other hand the same may be communicated to a second fractional crystallization device similar to that of FIGURE 3 but operated at a different selective crystallizing control point. Further, it is especially desired to process a second fractional crystallization in many instances by directing the mother liquor enriched such as by aluminum chloride from outlet 24 to the feed inlet of another fractional crystallization device of the same type operated at a different crystallization point for selective crystallization. The resulting aluminum chloride crystals will be largely contaminated by ferrous chloride subject to elimination by further series crystallization.

Figure 2:
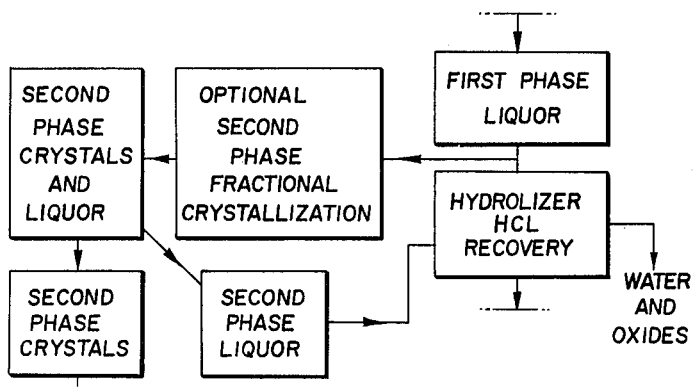
FIGURE 2 is a modification adapted to be read with FIGURE 1 and illustrating a second series fractional crystallization adapted for obtaining a second metal chloride adapted to be reduced to metallic form in continuous operation of the process of the invention.

The optional second phase fractional crystallization is illustrated in FIGURE 2 in flow sheet form wherein it will be evident that the second phase liquor is returned to a hydrolizer for recovery of hydrochloric acid therefrom, this hydrolizer being the same one used for the recovery of hydrochloric acid from the first phase liquor.

One preferred form of hydrolizer is illustrated in FIGURE 4 wherein a fluidized bed technique is employed for converting the remaining chlorides in solution in the mother liquor to hydrogen chloride gas, water vapour and oxides. While the creation of a fluid bed agitated and kept in motion by a hot gas stream is known as to the techniques of creating the flow characteristics necessary as for example see a paper "A Technique for Containing Gases with Coarse Solid Particles," by Mathur and Geishler, National Research Council of Canada, Ottawa, reported in the American Institute of Chemical Engineering Journal, volume 1, Number 2, page 157, and issued as N.R.C. Bulletin 3616 and references reported therein, the hydrolysis apparatus of the invention revealed in FIGURE 4 is especially adapted to service according to the method of the invention. A castable refractory firing chamber 31 has injected therein compressed air or oxygen with natural gas preferably at about 5 pounds per square inch to provide pressure combustion generation of hot gases by burner structure 32. The gases under pressure flow through a perforated plate structure 33, to effect hydrolysis of mother liquor sprayed into fluidizing chamber 34 by nozzle 35 and obtained from the outlet 24 of the apparatus of FIGURE 3. In operation, hydrolysis of the mother liquor effects the delivery of coarse oxides through the primary outlet 36. The upper end of the fluidizing column 37 extends into an expansion chamber 38 from which gaseous and entrained water vapours and fine oxides are delivered by line 39 to an extractor cyclone 40 delivering exhaust gas by line 41 to a hydrogen chloride absorber, to be described, and adapted to extract the hydrogen chloride therefrom. The fine oxides are delivered from the lower exit end 42 of the cyclone. The coarse and fine oxides may be used for pigment purposes or may be reduced to metallic form by known reduction techniques. The same may also be processed according to this invention for selection of particular metals therefrom.

The efficient recovery of hydrogen chloride is an important aspect of the method of this invention and accordingly in following the return of hydrogen chloride to the leaching stage of FIGURE 1 at which the minerals are dissolved in hydrochloric acid it will be observed that the hydrogen chloride gas from the hydrolizer of FIGURE 4, that is the cyclone outlet 41 thereof, proceeds to a conventional hydrogen chloride absorber such as is illustrated in FIGURE 5 wherein water is introduced into inlet 43 of column 44 the upper portion 45 of the column containing an absorption column medium such as glass Raschig Rings located above a gas cooling medium therein. Gases from the outlet 41 of the apparatus of FIGURE 4 are introduced into the gas inlet 47 in the base of column 44, the upper end of the column having a hydrogen outlet line 48 adapted for recycling of hydrogen available therefrom to the stage of chloride reduction calling for the introduction of hydrogen illustrated in FIGURE 1. The lower end of column 44 accommodates an acid cooling portion 49 having therein a cooling coil 50 from which an outlet line 51 for aqueous hydrogen chloride proceeds to provide an acid outlet 52 for delivery of hydrochloric acid to the leaching stage of the method and process of the invention.

Referring again to the first phase crystals obtained by fractional crystallization with apparatus as illustrated in FIGURE 3, said crystals may be removed from the collector 22 through closable opening 53 thereof. In this connection it is desired not to limit the design of the apparatus of FIGURE 3 to a batch type crystal collector of the form shown since the crystal collector may be of a form providing for auger delivery of crystals from chamber 22 by placing a rotating auger over a curved screen supported in place of screen 23. In this way continuous delivery of crystals may be obtained from the outlet 53 to a conveyor belt (not shown) for communication to conventional washing and filtering apparatus from which the selective chloride metal crystals are delivered again by suitable conveyor to a dehydrator of the form illustrated in FIGURE 6.

Figure 6:
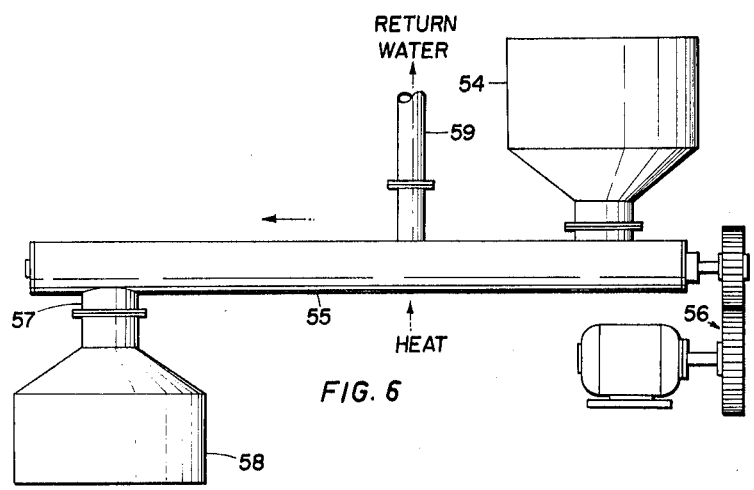
FIGURE 6 illustrates a suitable form of metal chloride crystal dehydrator according to this invention.

The dehydrator of FIGURE 6 embodies a hopper 54 into which the crystals are delivered to feed to the auger tube 55 containing an auger (not shown) and driven by the geared motor mechanism 56 toward a delivery end 57 thereof delivering same to a container or drum 58 or alternatively as may be preferred to a second crystallizer in series. Tube 55 is externally heated by any suitable means as indicated by the "heat arrow" in this figure.

Low gas flame heating induction or resistance heating of tube 55 may be employed or again electrical resistance elements may be wound about such tube. In any event an exhaust line 59 is suitably located to convey water vapour from tube 55.

Figure 7:
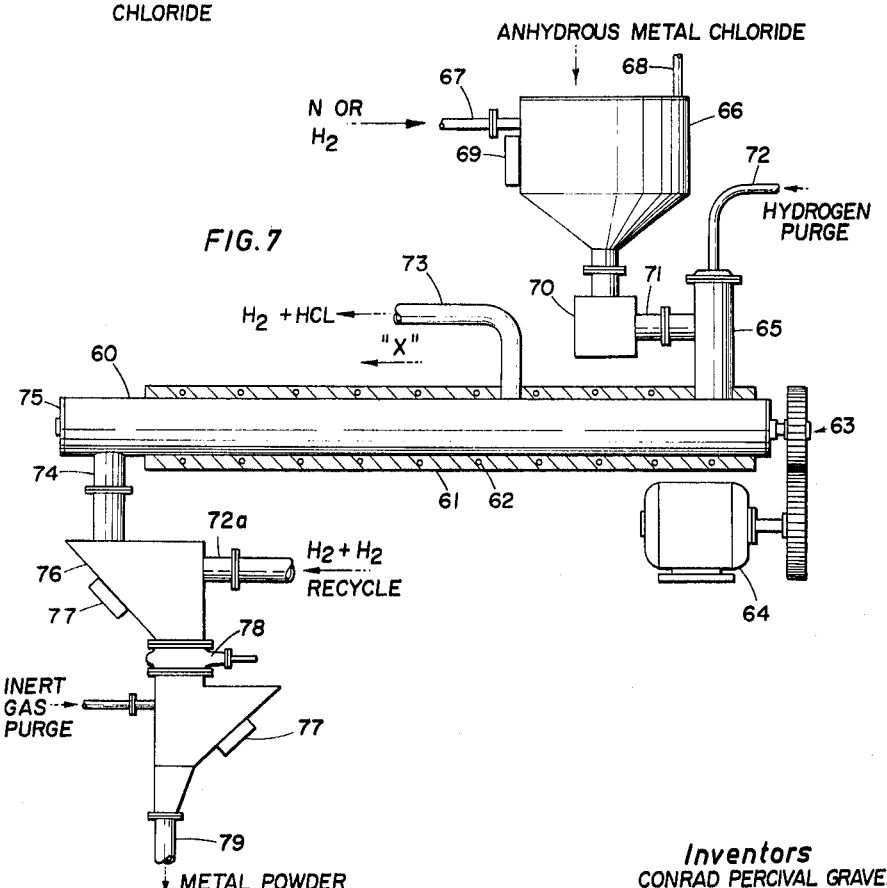
FIGURE 7 is a sectional view of a suitable form of metal chloride reduction unit employing hydrogen as a reducing agent.

In FIGURE 7 is disclosed a suitable form of a reducing reactor in which the selected dehydrated metal chloride is converted to metallic form by reduction with hydrogen. The reaction is carried on at less than melting temperature of the ferrous chloride at least until the ferrous chloride is substantially reduced, thereafter the temperature may be raised to hasten the completion of the reaction. The reactor comprises a stainless steel tube 60 supported within a refractory or insulation casing 61 containing suitable heating elements such as electrical resistance heating coils 62. Shaft 63 driven by gear connection to motor 64 carries a plurality of paddles within the reactor tube 60 designed to cause material within said tube to move in the direction of arrow X. Feed tube 65 provides for entry of ferrous chloride into the reactor tube 60 by delivery of the ferrous chloride from the protected atmosphere hopper 66 having an inlet tube 67 for inert gas and a circulating outlet tube 68 therefor. An agitator or vibrator 69 ensures the delivery of the ferrous chloride to a vibrating feeder device 70 of conventional form adapted to deliver the powder like ferrous chloride to the feeder tube 65 through the communicating passage 71. Inlet tube 72 provides for the introduction of purge hydrogen to the feeder tube 65. Inlet tube 72a provides for the introduction of hydrogen reducing gas in such a manner as to flow countercurrent to ferrous chloride motion in reactor tube 60. In operation the ferrous chloride proceeds in an atmosphere of hydrogen along the reactor tube 60 in the direction of arrow X. The reactor outlet 73 provides for the discharge of hydrogen and hydrochloric acid gas mixture to an absorber of the form described in FIGURE 5 from which reclaimed hydrochloric acid is returned to the leaching step of dissolving the prepared mineral substances in hydrochloric acid as revealed in FIGURE 1.

An outlet fixture 74 near the closed end 75 of reactor tube 60 delivers the reduced ferrous chloride in metal powder form to a hopper 76 having a vibrator or agitator 77 thereon and enclosed to provide for a protected atmosphere of hydrogen whereby the resulting metal powder may be delivered through gas gate 78 and the powder delivery outlet 79. The metal powder delivered from outlet 79 may then be washed. While the reactor of FIGURE 7 appears to embody a batch load type of hopper it will be apparent that dehydrated ferrous chloride may be continuously delivered from the outlet of the dehydrator of FIGURE 6 to the hopper of the reactor FIGURE 7 in a closed gas circuit if desired.

The dehydration of the metal chloride crystals prior to reduction thereof to metallic form has a three-fold purpose according to this invention. To conserve energy input in the reduction reactor, to inhibit the production of iron oxides in the reduction stage, to improve the flow and handling characteristics of the ferrous chloride during reduction.

The hydrochloric acid gas absorber shown in FIGURE 5 is of a form which may be used for reclaiming hydrochloric acid from the exhaust gas of the hydrolizer of FIGURE 4 as described, in which event the gas outlet of the absorber would contain little or no hydrogen. When, however, this form of absorber is used for reclaiming hydrochloric acid gas from the gases given off by the reactor of FIGURE 7, the exhaust gas of the absorber will be substantially hydrogen adapted to be recycled as hydrogen for the reactor of FIGURE 7. In this way the process of the invention limits the addition of both hydrogen and hydrochloric acid to the process during operation.

As contrasted with pyrometallurgical processes the invention requires a different kind of preparation of the material in that it is only necessary to comminute the ores or minerals to sufficiently small size to render them adaptable for efficient chemical attack by hydrochloric acid. In addition it may be necessary to modify a particular mineral by roasting to render the same adaptable to form the desired metal chloride in solution in hydrochloric acid. Accordingly, concentration of the ore prior to processing according to the invention will seldom be required or desirable except perhaps where large crystals of silica or other gang material may be removed with some benefit to avoid an undue load of handling of excess material through to the first filter. Other than this however the efficiency of the process in no way depends on concentrating methods. Accordingly the method and apparatus of the invention renders mineral extraction available from high grade as well as low grade ores and minerals.

The method of the invention embodies a combination of steps integrated from the mineral itself to the final metal product adapted for continuous processing in which the recirculation of hydrochloric acid and hydrogen lowers the cost of utilizing same to practical economic levels where the mineral substances are roasted according to this invention.

The apparatus of the invention integrated with the combination of a continuous selective crystallizing chamber, means for reducing the chloride crystals to metal and means for hydrolizing the uncrystallized mother liquor to recover the hydrochloric acid for recirculation and to separate the remainder thereof as water and oxides, enables a practical realization of the objects hereof.

Many useful ores and minerals contain large amounts of sulphur and arsenic. It is apparent that the teachings of this invention enable substantially the effective elimination and removal of sulphur and arsenic as the ores and minerals are dissolved in aqueous hydrochloric acid. Hydrogen, hydrogen sulphide and other gases will thus be given off during the leaching step. Hydrogen available from the gases given off may be used at the reduction stage for the reduction of metal chlorides to metal powder. Sulphur may also be recovered by known techniques. The low occurrence of sulphur and what may be regarded as impurities in the resulting product is illustrated in Table 1 and is also substantiated by the following Table 2 wherein a comparative analysis is shown of iron powder produced from Swift Creek ore according to the invention and Haganes iron powder.

It is generally accepted that Swedish Haganes Iron Powder is a satisfactory standard against which to compare powders produced by other processes. Accordingly the following Table 3 of Sintering Density and Bending Strength is of interest.

TABLE 2

*Result of analysis*

| Iron Powder | C | Si | Mn | Cu | Ni | Co | P | S | Insol. |
|---|---|---|---|---|---|---|---|---|---|
| Alberta Iron Powder | 0.03 | 0.01 | Trace | Trace | 0.01 | | 0.054 | 0.006 | 0.06 |
| Haganes Iron Powder MH-100 | 0.09 | 0.01 | 0.03 | Trace | | | 0.006 | 0.007 | 0.47 |

TABLE 3
*Sintering density and bending strength*

| Pressure | 2 T/cm.² | | 4 T/cm.² | | 6 T/cm.² | |
|---|---|---|---|---|---|---|
| Characteristics | Density | Bending Strength (kg./mm.²) | D. (g./cc.) | B.S. (kg./mm.²) | D. (g./cc.) | B.S. (kg./mm.²) |
| Alberta Iron Powder [1] | 5.4 | 21.5 | 6.3 | 37.1 | 6.8 | 47.4 |
| Haganes MH-100 [1] | 5.2 | 16.1 | 6.2 | 31.5 | 6.7 | 43.5 |

[1] Test pieces were formed only of iron powder, using neither binder nor lubricant.

The comparative information available from Tables 2 and 3 was obtained by independent analysis and reveals the utility of the iron product obtained by the direct hydrometallurgical extraction method and apparatus of the invention. The invention is also useful for obtaining metal product for other uses such as melting stock, pigment and chemical purposes.

In the selective crystallization step it will be realized that the degree of selectivity is affected by the dominance of the selected member in the mother liquor as to other metal chloride members therein. Thus a second crystalliaztion of the mother liquor having had a dominant metal chloride substantially removed therefrom by first selective crystallization may result in some instances in second selective crystallization crystals comprising a second metal chloride member mixed with additional crystals of the first member. In such instance it may be desired to resort to chemical precipitation techniques of one member prior to a second series selective crystallization and/or to proceed to a third series selective crystallization, in which any one or more of the successive steps, certain of the crystals formed are utilized to control the dominance of members to be selected. Such special technique will however not ordinarily be resorted to where the crystallization point for the selection of one metal chloride crystal is substantially separated from the crystallization point for the selection of another undesired metal chloride crystal. In complex mixtures, however, there will be some degree of overlap for the conditions of crystallization of the various members and in such instance the series crystallization techniques alone or combined with chemical precipitation techniques will be of assistance.

It is intended that this disclosure should not be construed in any limiting sense other than that indicated by the scope of the invention as defined by the following claims having regard to the prior art.

What we claim is:

1. A hydrometallurgical method for selectively removing a metal of high purity from metal compound containing substances comprising: leaching said substances in aqueous hydrochloric acid to dissolve at least said metal therein as a metal chloride; filtering said leached substances to separate the chloride containing liquor and solids; selectively crystallizing from said liquor a predetermined metal chloride in crystalline form; withdrawing the liquor from said crystals and hydrolizing said liquor to obtain hydrogen chloride gas and metal oxides of noncrystallized chlorides; adding water to said hydrogen chloride gas and recycling same for leaching of said substances; heating said metal chloride in the presence of hydrogen at less than melting temperature thereof to reduce the same to metallic form of a purity greater than 99.0 percent of said metal and to generate hydrochloric acid gas; and recycling said acid gas in water to leaching of said substances.

2. A hydrometalurgical method for selectively removing a metal of high purity from metal compound containing substances comprising: leaching said substances in aqueous hydrochloric acid to dissolve at least said metal therein as a metal chloride; filtering said leached substances to separate the chloride containing liquor and solids; selectively crystallizing from said liquor a predetermined metal chloride in crystalline form; withdrawing the liquor from said crystals and hydrolizing said liquor to obtain hydrogen chloride gas and metal oxides of noncrystallized chlorides; adding water to said hydrogen chloride gas and recycling same for leaching of said substances; dehydrating said crystals to remove a substantial portion of the water of hydration thereof; heating said metal chloride in the presence of hydrogen at less than melting temperature thereof to reduce the same to metallic form of a purity greater than 99.0 percent of said metal and to generate hydrochloric acid gas; and recycling said acid gas in water to leaching of said substances.

3. A hydrometallurgical method for selectively removing metal of high purity from metal compound containing substances comprising: leaching said substances in aqueous hydrochloric acid to dissolve at least said metal therein as a metal chloride; filtering said leached substances to separate the chloride containing liquor and solids; subjecting said chloride liquor to a predetermined temperature and pressure selectively to crystallize out a predetermined metal chloride in crystalline form; withdrawing the liquor from said crystals and hydrolizing said liquor to obtain hydrogen chloride gas and metal oxides of non-crystallized chlorides; adding water to said hydrogen chloride gas and recycling same for leaching of said substances; heating said metal chloride in the presence of hydrogen at less than melting temperature thereof to reduce the same to metallic form of a purity greater than 99.0 percent of said metal and to generate hydrochloric acid gas; and recycling said acid gas in water to leaching of said substances.

4. A hydrometallurgical method for selectively removing a metal of high purity from metal compound containing substances comprising: leaching said substances in aqueous hydrochloric acid to dissolve at least said metal therein as a metal chloride; filtering said leached substances to separate the chloride containing liquor and solids; subjecting said chloride liquor to a predetermined temperature and pressure selectively to crystallize out a predetermined metal chloride in crystalline form; withdrawing the liquor from said crystals and hydrolizing said liquor to obtain hydrogen chloride gas and metal oxides of noncrystallized chlorides; adding water to said hydrogen chloride gas and recycling same for leaching of said substances; dehydrating said crystals to remove a substantial portion of the water of hydration thereof; heating said dehydrated crystals in the presence of hydrogen at less than melting temperature thereof to reduce the same to metallic form of a purity greater than 99.0 percent of said metal and to generate hydrochloric acid gas; and recycling said acid gas in water to leaching of said substances.

5. A hydrometallurgical method for selectively removing a metal of high purity from metal compound containing substances comprising: preparing said substances to render predetermined minerals thereof soluble in hydrochloric acid; leaching said prepared substances in aqueous hydrochloric acid to dissolve at least said metal therein as a metal chloride; filtering said leached substances to separate the chloride containing liquor and solids; subjecting said chloride liquor to a predetermined temperature and pressure selectively to crystallize out a predetermined metal chloride in crystalline form; withdrawing the liquor from said crystals and hydrolizing said liquor to obtain hydrogen chloride gas and metal oxides of noncrystallized chlorides; adding water to said hydrogen chloride gas and recycling the latter for leaching of said substances; dehydrating said crystals to remove a substantial portion of the water of hydration thereof; heating said dehydrated crystals in the presence of hydrogen at less than melting temperature thereof to reduce the same to metallic form of a purity greater than 99.0 percent of said metal and to generate hydrochloric acid gas; and recycling said acid gas in water to leaching of said substances.

6. A hydrometallurgical method for selectively removing a metal of high purity from metal compound containing substances comprising: leaching said substances in aqueous hydrochloric acid to dissolve at least said metal therein as a metal chloride; filtering said leached substances to separate the chloride containing liquor and solids; selectively crystallizing from said liquor a predetermined metal chloride in crystalline form; withdrawing the liquor from said crystals and hydrolizing said liquor to obtain hydrogen chloride gas and metal oxides of noncrystallized chlorides; adding water to said hydrogen chloride gas and recycling same for leaching of said substances; heating said metal chloride in the presence of hydrogen at less than melting temperature thereof to reduce the same to metallic form of a purity greater than 99.0 percent of said metal and to generate a mixture of hydrogen and hydrochloric acid gas; recycling said acid gas in water to leaching of said substances; and recycling said hydrogen of said mixture to reduction of said metal chloride.

References Cited by the Examiner

UNITED STATES PATENTS

| | | | |
|---|---|---|---|
| 125,464 | 4/1872 | Larkin | 75—121 |
| 1,275,374 | 8/1918 | Bradley | 75—114 X |
| 1,292,580 | 1/1919 | Coe | 23—299 |
| 2,045,092 | 6/1936 | Mitchell | 75—111 X |
| 2,094,275 | 9/1937 | Mitchell | 75—111 |
| 2,113,028 | 4/1938 | Kuentzel | 23—87 X |
| 2,290,843 | 7/1942 | Kinney | 23—87 X |
| 2,418,148 | 4/1947 | Williams | 75—34 |
| 2,418,930 | 4/1947 | Gorin | 23—97 X |
| 2,424,351 | 7/1947 | Christensen | 75—114 X |
| 2,446,181 | 8/1948 | Kraus | 75—111 X |
| 2,762,700 | 9/1956 | Brooks | 75—0.55 |
| 2,766,115 | 10/1956 | Graham et al. | 75—114 X |
| 2,818,328 | 12/1957 | Francis | 75—0.55 |
| 2,867,524 | 1/1959 | Chang | 75—0.55 |
| 2,903,341 | 9/1959 | Pike | 23—87 |

FOREIGN PATENTS

| | | |
|---|---|---|
| 793,700 | 4/1958 | Great Britain. |
| 896,893 | 5/1962 | Great Britain. |

HYLAND BIZOT, *Primary Examiner.*

DAVID L. RECK, BENJAMIN HENKIN, *Examiners.*

H. W. CUMMINGS, N. F. MARKVA,
*Assistant Examiners.*